United States Patent [19]

Mintzer et al.

[11] Patent Number: 4,569,081
[45] Date of Patent: Feb. 4, 1986

[54] METHOD FOR EXPANSION OF A DIGITAL IMAGE

[75] Inventors: Frederick C. Mintzer, Shrub Oak; Karen L. Anderson, Peekskill; Joan L. Mitchell, Ossining, all of N.Y.

[73] Assignee: International Business Machines Corporation, Armonk, N.Y.

[21] Appl. No.: 567,309

[22] Filed: Dec. 30, 1983

[51] Int. Cl.⁴ ............................................. G06K 9/42
[52] U.S. Cl. ..................................... 382/47; 358/135; 358/287
[58] Field of Search ................. 382/47; 358/287, 135; 340/731

[56] References Cited

U.S. PATENT DOCUMENTS 4,139,092 3/1980 Stoffel ................................ 358/135
4,394,693 7/1983 Shirley .............................. 358/287
4,419,697 12/1983 Wada ................................. 358/287

Primary Examiner—Leo H. Boudreau
Assistant Examiner—Joseph Mancuso
Attorney, Agent, or Firm—George E. Clark; Thomas P. Dowd

[57] ABSTRACT

A method for expanding a binary image includes the steps of: storing the image in bit sequence; inserting for each string of 5 bits along a first axis one or more expansion bits, to convert each said string of 5 bits to a string of 6 bits; assigning a value to each expansion bit generated by the above step; inserting one or more rows of expansion bits for each 5 rows of bits along a second axis of the image to convert each 5 rows of bits to 6 rows of bits along the second axis of the image; assigning a value to each expansion bit generated by the above steps; storing the enlarged image generated by the above steps.

14 Claims, 5 Drawing Figures

Algorithm for Setting Inserted Bits if c=d, then x=c
otherwise, x=(a AND f) OR (e AND b)

Value of x for all possible values of a, b, c, d, e, and f

Algorithm for Setting Inserted Bits

| a | b |
|---|---|
| c | x |
| e | f | if c=d, then x=c otherwise, x=(a AND f) OR (e AND b)

Value of x for all possible values of a, b, c, d, e, and f

METHOD FOR EXPANSION OF A DIGITAL IMAGE

BACKGROUND OF THE INVENTION

1. Field of the Invention

The present invention relates to digital image processing methods and more particularly to methods for image enlargement.

2. Description of the Prior Art

Although there are a number of image enlargement methods in the prior art, none is known which shows or even suggests the method of the present invention.

SUMMARY OF THE INVENTION

Therefore, it is an object of the present invention to enlarge a binary image by a method including the steps of: storing the image in bit sequence; inserting for each string of n bits along a first axis one or more expansion bits, to convert each said string of n bits to a string of m bits, where m is greater than n; assigning a value to each expansion bit generated by the above step; inserting one or more rows of expansion bits for each i rows of bits along a second axis of the image to convert said i rows of bit to j rows of bits along the second axis of the image, where j is greater than i; assigning a value to each expansion bit generated by the above step; storing the enlarged image generated by the above steps.

Accordingly, the present invention enlarges a binary image by a method including the steps of: storing the image in bit sequence; inserting for each string of 5 bits along a first axis one or more expansion bits, to convert each said string of 5 bits to a string of 6 bits; assigning a value to each expansion bit generated by the above step; inserting one or more rows of expansion bits for each 5 rows of bits along a second axis of the image to convert each 5 rows of bits to 6 rows of bits along the second axis of the image; assigning a value to each expansion bit generated by the above step; storing the enlarged image generated by the above steps.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 1 is a chart showing a method for assigning values to inserted bits according to the present invention.

In the drawing, like elements are designated with similar reference numbers, and identical elements in different specific embodiments are designated by identical reference numbers.

DESCRIPTION OF PREFERRED EMBODIMENTS OF THE INVENTION

Figure 2:
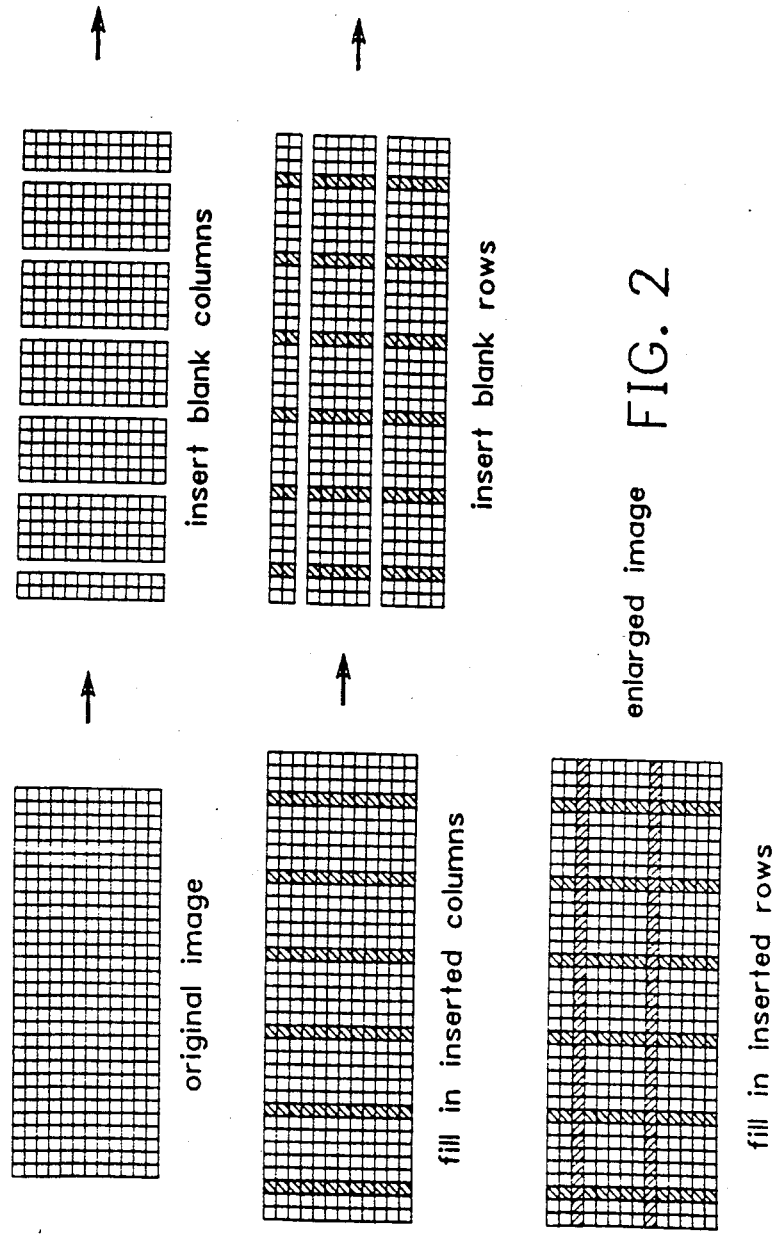
FIG. 2 is a schematic diagram of the method of the present invention.

The method according to the present invention enlarges a binary image by one-fifth on both the horizontal and vertical axes. Images are considered to exist in storage reading from left to right across the rows, from the top of the image to the bottom. The enlargement may be performed in situ, or the output may occupy storage which does not contain the beginning of the original image (so that no data from the original image can be overwritten with data from the output image before it is used).

The method has a standard Conversational Monitor System (CMS) interface with three explicit parameters. On entry, Register 1 contains the address of the area in storage where the three parameters (four bytes each) are located. The first parameter should be a pointer to a user-defined storage area which will be used as temporary storage. The size of this storage area should be 2250 bytes plus enough storage for two lines of the input image. The temporary storage area should begin on a 4 byte boundary or the program may run slower. The second parameter should be equal to the first parameter. The third parameter is a pointer to a list of parameters for the resolution change (described below).

Four parameters which control the resolution change, plus two returned values, are stored in a 24-byte buffer, and a pointer to that buffer is passed to RESCHG56. All parameters are full four-byte words. FIXED(31) specifies a 4 byte value; PTR(31) indicates variables which will be addresses.

| PARM | DCL | |
|---|---|---|
| | | PTR(31), |
| 1 LIST BASED(PARM), | | |
| 2 INIMAGE | | PTR(31), |
| 2 OUTIMAGE | | PTR(31), |
| 2 IROWS | | FIXED(31), |
| 2 ICOLS | | FIXED(31), |
| 2 OROWS | | FIXED(31), |
| 2 OCOLS | | FIXED(31); |

INIMAGE—Pointer to the first byte (i.e. the upper left-hand corner byte) of the original image.
OUTIMAGE—Pointer to the location where the first byte of the output image is to be stored.
IROWS—Number of lines in the original image.
ICOLS—Number of (byte) columns in the original image.
OROWS—On return from RESCHG56, contains the number of lines in the output image.
OCOLS—On return from RESCHG56, contains the number of (byte) columns in the output image.

The problem considered here is that of enlarging a binary image by 1/5 in both the horizontal and vertical dimensions. The enlargement method described uses a novel combination of techniques, including a fast row expansion algorithm by table lookup for a five-byte row and a new algorithm which exploits the fact that a binary image typically includes large areas containing only zero (white) picture elements, to drastically reduce the amount of processing required. This results in code which is significantly faster than prior art methods.

The bits making up the image are assumed to be stored packed eight to a byte, with each line beginning on a byte boundary. The image enlargement may take place in situ, or the output image may be constructed in an area of storage which does not contain the beginning of the original image (so that no data from the original image can be overwritten with expanded image data before it is used). Since bit operations are computationally expensive, IBM System/370 word (32-bit) operations are used to process many bits at a time.

A detailed description of the method is shown below. First, a bit is inserted after each five bits in each row of the original image. The new bits (which will be referred to as "expansion bits" in the remainder of this description) are then filled in according to the following algorithm:

previous expanded line—a o b
current expanded line—c x d
next expanded line—e o f x is the bit to be filled in; the o's are expansion bits in neighboring lines and do not participate in the decision to set bit x. a, b, c, d, e, and f are the bits bordering the bit to be filled in. Bit x is set as follows:

1. If c=d, then x is set equal to c; otherwise
2. If a and f are both one, x is set to one; otherwise
3. If e and be are both one, x is set to one; otherwise
4. x is set to zero.

In other words, the expansion bit is set to one if at least one of the horizontally adjacent bits is one and any pair of bits on either a horizontal or diagonal line through x are both one; otherwise the expansion bit is set to zero. The method is illustrated in FIG. 1.

Following this expansion in the horizontal direction, a new line is inserted after each five lines of the image, and the line is filled in using the same algorithm, but with the bit mask above rotated ninety degrees. The new expansion bits do not participate in the decision to set bit x.

previous expanded line—b d f
inserted line—o x o
next expanded line—a c e

The inserted bits and lines are so placed that the third bit column and the third row in the output image are the first column/row of inserted bits. By inserting bits in these positions, and then filling them in using an algorithm which cannot create new runs, we produce an algorithm which is exactly reversed by the 6:5 reduction algorithm described in co-pending U.S. application Ser. No. 567,310, assigned to the same assignee as this application, which algorithm removes the third pel from each group of six pels if it can do so without destroying a run. Thus, an expansion by 1/5, as described herein followed by a 6:5 reduction, as described in U.S. application Ser. No. 567,310 results in the original image being restored. Furthermore, an image which is first reduced, then passed through several stages of 5:6 expansion followed by 6:5 reduction, and is finally expanded to the original size, suffers only the degradation of the first reduction.

A more detailed discussion of the enlargement algorithm follows.

The image expansion begins at the end of the image data and proceeds to the beginning. Before the expansion process begins, the first two rows of the original image are copied to temporary storage. This is so that if the image is expanded in situ, this data will not be destroyed before it can be used. If the original and expanded images begin at the same location in storage, the beginning of the fourth line of the expanded image (which will contain the data from the third line of the original image) is beyond the end of the third line of the original image, so all lines beginning with the third line of the original image will be expanded into areas of storage which do not overlap the original line. If the original and expanded images do not begin at the same location in storage, then either they do not overlap, in which case there is no problem, or the input image begins before the output image, in which case the beginning of the fourth line of the expanded image is again beyond the end of the third line of the original image, so only the first two lines may need to be copied.

The processing consists of four basic operations: (1) insertion of the expansion bits in the rows, giving them a value of zero unless both adjacent bits in the row are one; this will be called "row expansion" in the remainder of this disclosure; (2) the remainder of the procedure used to set the expansion bits, which will be called "row fill" in the remainder of this disclosure; (3) insertion of a blank line, which will be called "line insertion"; and (4) the filling in of the inserted line, which will be called "line fill". Row expansion sets an expansion bit to one if both horizontally adjacent pels are one; otherwise the bit is set to zero. Row fill completes the fill-in operation shown in FIG. 1. The image is processed in two passes. The first pass performs row expansion, row fill, and line insertion. The second pass implements the line fill.

Pass one works with one line of the original image and three lines of the enlarged image at a time. Before expansion of a line, the two most recently expanded lines of output data are available. Both row expansion and row fill have been performed on the older of these lines; the newer line has only been row expanded. An input line is expanded by zeroing the storage in the output image which will contain the newly expanded line and then performing row expansion on one five-byte unit of the input row at a time. Six bytes of output are produced for each five bytes of input. Before the loop to process the row begins, the first byte of the last (possibly partial) five-byte unit is saved and replaced in storage by a nonzero value. The loop looks at five bytes of input at a time. If all five bytes are zero, no processing is necessary since the corresponding area of the output image has already been zeroed. Ensuring that the last unit in the row contains nonzero data provides an exit at the end of a line from the portion of the loop which processes zero data without the necessity of doing an explicit test for end-of-line within that part of the loop.

The row expansion operation works on a five-byte unit. If a five-byte unit is found to contain nonzero data, it is first tested to determine if the end of the line has been reached. If so, the loop is exited; the original byte is restored to the input, and the input is expanded, ANDed with masks which eliminate data contributed by bytes in the following line of the original image, and OR'd with the data already in the output image, so as not to destroy data on the following output line. If the end of the line has not been reached, the input data are expanded, the resulting six bytes are stored in the output image, and the loop continues.

Figure 3:
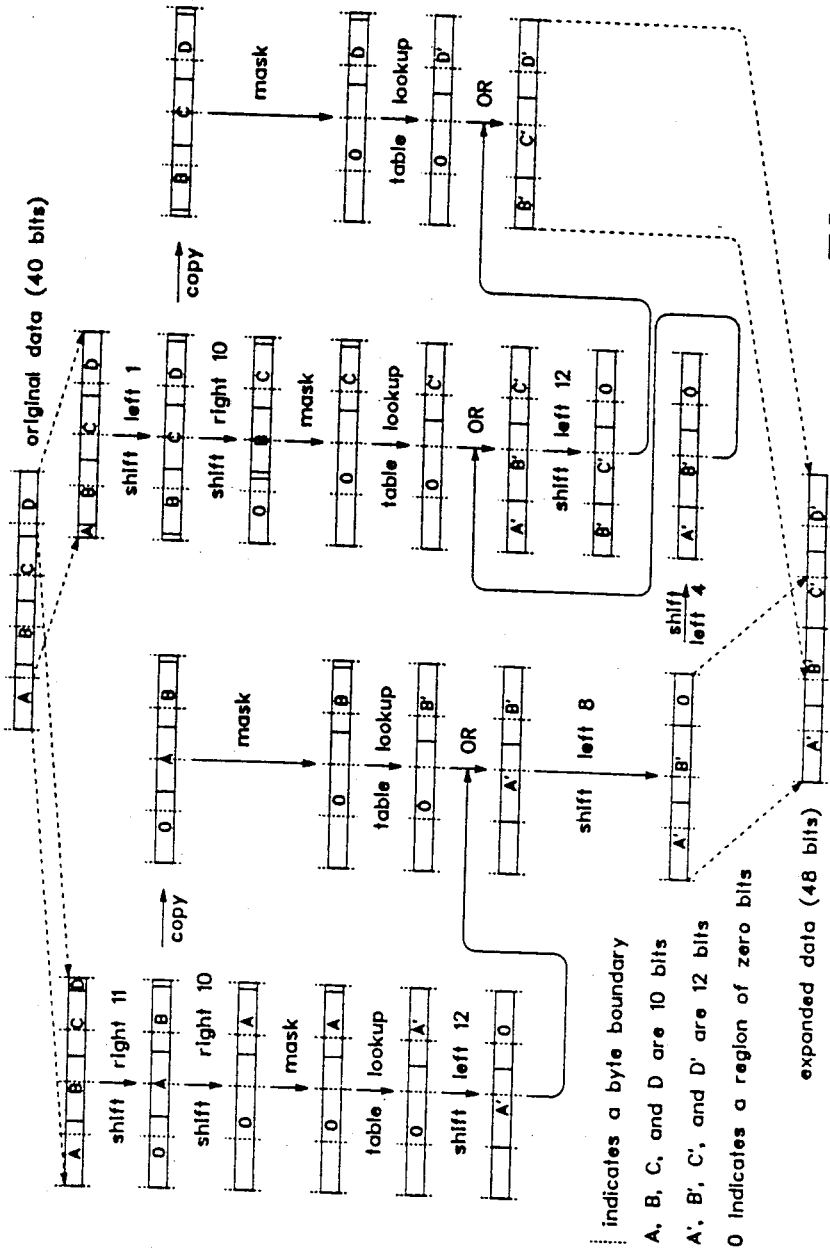
FIG. 3 is a flow diagram of a portion of the row expansion method of the present invention.

FIG. 3 illustrates the row expansion process which expands five bytes of input data. The data are divided into four units of ten bits each, and a lookup table is used to insert the expansion bits.

The expansion bits are positioned as follows:

XXOXXXXXOXXX where the O's are the expansion bits. These bits are set to one if both adjacent bits are one; otherwise they are set to zero. In order to get the groups of ten bits into registers for use in indexing the lookup table, the input data are loaded into two (four-byte) registers; one contains bytes 1-4 of the input, the other bytes 2-5. The input is shifted and copied as indicated; all bits except the ten bits required are set to zero by ANDing the data with a mask whose hexadecimal representation in 000007FE. The ten-bit units are shifted left one bit in the registers because there are two bytes of table data for each permutation of input bits. The results of the table lookups are shifted and OR'd together as indicated. Two storage operations place the output in storage: the first saves three bytes of output and one zero byte, and the second rewrites the third output byte and adds three more bytes.

While the input line is being expanded, the line previously expanded is processed by the row fill algorithm. Row fill operates on three bytes at a time. Note that the expansion bits in a three-byte unit are placed as follows:

XXOXXXXX OXXXXXOX XXXXOXXX where the O's are the expansion bits. Since only the expansion bits may be changed by this algorithm, there is no interaction between one three-byte unit and the next, and all three-byte units have their expansion bits in the same positions. Two three-byte units are processed for each five bytes in the input line (therefore six bytes of output). If the five input bytes are all zero, there can be no change in the previous line, since it can only change if both bits on a diagonal are ones, and one bit on each diagonal must be zero if the input is zero. Thus the same test which allowed expansion of the input to be omitted allows processing of the previous line to be skipped. If the input contains nonzero data, the expanded input is masked to determine whether any of the diagonal bits are nonzero; if so, the expansion bits in the previous line are calculated using data from all three available output lines.

Figure 4:
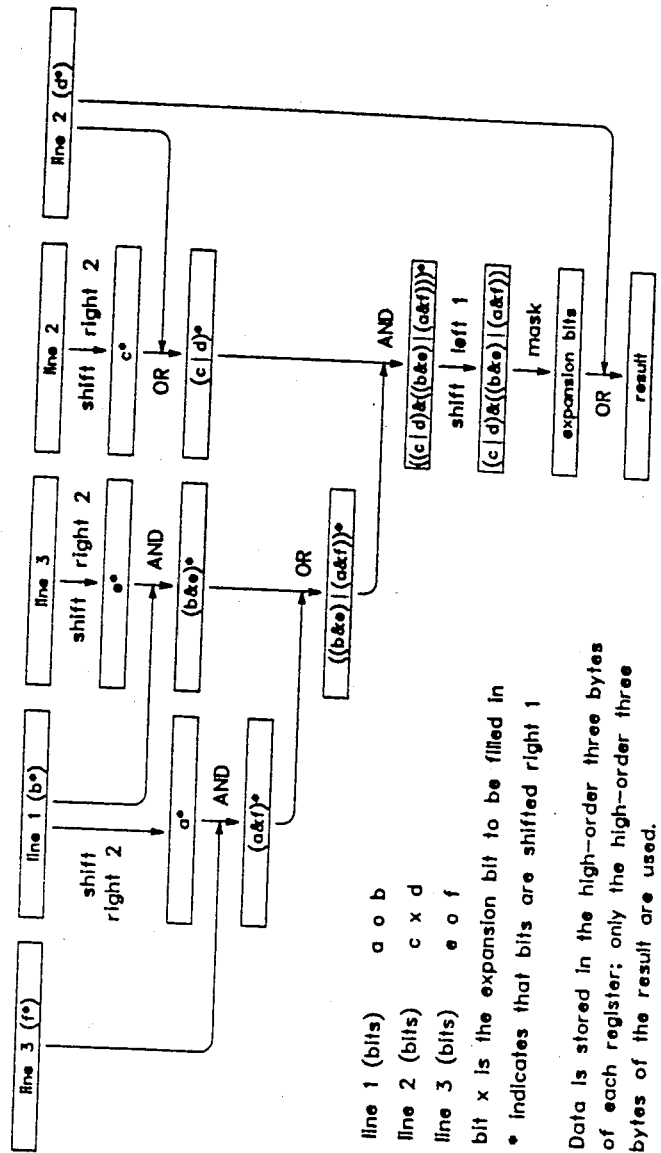
FIG. 4 is a flow diagram of the method for assigning values to bits inserted in the image in accordance with the present invention.

The row fill algorithm is described by FIG. 4. Data from the new line, the previous line, and the line immediately before the previous line are used. Three bytes from each line are read into the high-order three bytes of a register. Each pair of diagonal bits is ANDed together, and the results are then OR'd together and ANDed with the OR of the two adjacent bits on the line being filled in. The result is that a bit is set to one if both bits on either diagonal are ones and at least one of the horizontally adjacent bits is one. Much of this calculation is carried out with the data shifted one bit to the right of its normal position, because it is faster and requires fewer instructions to shift the contents of one register two bits than to shift the contents of two registers one bit each. The bits are then ANDed with a mask whose hexadecimal value is 20820800 to clear all bits except the expansion bits, since only the expansion bits may be altered. The result is OR'd with the data in the line being filled in and stored. Note that in addition to setting up the non-expansion bits, the "OR" operation sets expansion bits for which both adjacent bits are ones to one, since these bits were set during row expansion.

The row fill operation is not done during processing of the first two lines of the original image to be processed (i.e. the last two lines of the image), since three lines of data are required. A separate loop is used for these lines, similar to the loop described above but omitting the row fill. Since the row fill process runs one line behind the row expansion process, row fill is not performed on the first and last lines of the image; this is equivalent to normal processing assuming a line of zero bits before and after the original image.

The main loop in the first pass of the enlargement algorithm expands five lines and then inserts a line of zeroes to be filled in later. Before the loop begins, enough lines are processed so that at loop exit there will be two lines of the original image remaining to be processed; these lines are read from the temporary storage to which they were copied. There are four special cases: the cases where the number of input rows is zero, one, two, or three. These cases are processed separately. Processing is similar to processing for larger images, but the original data must be read from the correct place.

After the first pass has processed the entire image, the empty horizontal lines placed in the output image must be filled in using the data from adjacent lines. This is the line fill operation. The adjacent lines are read four bytes at a time, beginning one byte before the beginning of the line. Each four bytes of input produces two bytes of output corresponding to the middle two bytes of input; the index is then incremented by two to read the next input words.

If the middle 18 bits of one of the input words are all zero, the corresponding two output bytes must also be zero since one bit on the vertical line and each diagonal through each of the middle 16 bits are zero. Since the inserted lines were zeroed when they were created, no processing is necessary. The loop which fills in the inserted lines makes use of this fact by the following process. The line preceding the line to be filled in is read four bytes at a time, as described above. (The line following the line to be filled in could be used instead; the choice is arbitrary.) The first two input words are placed in registers and OR'd together, with the result replacing the second input word. If the result is nonzero, the bits to be filled in in the new row are calculated using the first input word (which is still in a register) and a word from the line following the line being filled in, and the loop is repeated. If the result of the "OR" operation is zero, then both input words were zero and the next six output bytes must be zero. Each additional zero input word implies four more zero output bytes. When a nonzero input word is found, it is shifted right by 16 bits so that it will be positioned in the register as if it had been read in at the top of the loop, the processing for nonzero input is performed, and the loop repeats. While this procedure results in some unnecessary calculations (since it does not skip all cases where the middle 18 bits of the input are zero), it allows for more efficient skipping over large white areas than would a more careful test.

Figure 5:
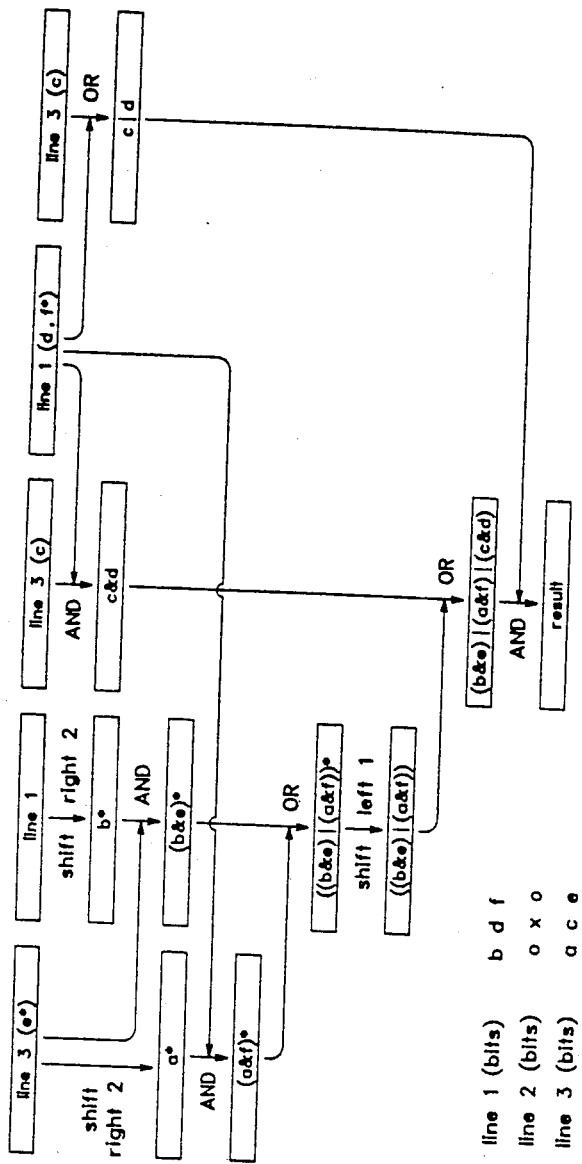
FIG. 5 is a flow diagram of the method for assigning values to bits inserted in new rows in accordance with the present invention.

FIG. 5 shows the procedure used to perform the line fill operation on three bytes of the inserted line. 32 bits of data from both the line preceding the line to be filled in and the line following the line to be filled in are used, although only 18 bits are actually needed to produce 16 bits of output. As in the second stage of the column expansion, much of the calculation is performed with the data shifted one bit to the right of its normal position. The three pairs of bits diagonally and vertically opposite each bit to be filled in are ANDed, and the results are OR'd, resulting in a one for each new bit for which at least one of these pairs are both ones. This result is ANDed with the OR of the vertically adjacent bits, to clear any bits whose vertical neighbors are both zero. The two bytes in the middle of the register containing the final result are stored; the other two bytes cannot be used because the end bits are not necessarily correct.

Thus, while the invention has been described with reference to preferred embodiments thereof, it will be understood by those skilled in the art that various changes in form and details may be made without departing from the scope of the invention.

What is claimed is:

1. A method for enlarging a binary image comprising the steps of:
   (a) storing said binary image in bit sequence;
   (b) inserting for each string of n bits along a first axis of said image one or more expansion bits, to convert each said string of n bits to a string of m bits, where m is greater than n and said first axis is the horizontal axis of said image and said expansion bits are disposed to form columns of said image;
   (c) assigning a value of each expansion bit generated by the preceding step (b) according to the steps comprising:
      (i) setting each expansion bit to one binary value if the pair of adjacent image bits on the horizontal line through said each expansion bit are both of said one binary value or if one said horizontally adjacent bit of said one binary value and both adjacent image bits on either diagonal line through said each expansion bit are also of said one binary value; otherwise,
      (ii) setting said each expansion bit to the other binary value;
   (d) inserting one or more rows of expansion bits for each i rows of bits along a second axis of the image to convert said i rows of bits to j rows of bits along the second axis, where j is greater than i and said second axis is the vertical axis of said image;
   (e) assigning a value to each expansion bit generated by the preceding step (d) according to the steps comprising:
      (i) setting each expansion bit to one binary value if the pair of adjacent image bits on the vertical line through said each expansion bit are both of said one binary value or if one said vertically adjacent bit is of said one binary value and both adjacent image bits on either diagonal line through said each expansion bit are also of said one binary value; otherwise,
      (ii) setting said each expansion bit to the other binary value;
   (f) said storing the enlarged image generated by the above steps.

2. A method according to claim 1 wherein said step of inserting for each string of n bits comprises inserting 1 bit for each said string of 5 bits to expand said image along said first axis by a ratio of 6 to 5.

3. A method according to claim 1 wherein said step of inserting for each i rows of bits comprises inserting 1 row for each said 5 rows to expand said image along said second axis by a ratio of 6 to 5.

4. A method according to claim 1 wherein said step of storing said enlarged image comprises overwriting said stored binary image to perform an in situ expansion of said image.

5. A method according to claim 1 wherein said step of storing said enlarged image comprises assigning said enlarged image to an area of storage separate from an area of storage in which said image was originally stored.

6. A method according to claim 1, comprising the further step of copying the bits representing the first two rows of said image in temporary storage before inserting said expansion bits.

7. A method according to claim 1, wherein said expansion bits are inserted by table lookup.

8. A method according to claim 7, wherein each of said expansion bits is assigned said one binary value by said table lookup that inserts the expansion bits, if both adjacent image bits on the respective horizontal or vertical line through the particular bit are of said one binary value, otherwise each said expansion bit is set to the other binary value by said table lookup, and reset to said one binary value if one such bit is of said one binary value and both adjacent image bits on either diagonal line through said particular expansion bit are also of said one binary value.

9. A method according to claim 1, wherein said one binary value is 1.

10. A system for enlarging a binary image comprising:
   (a) means for storing said binary image in bit sequence;
   (b) first means for inserting for each string of n bits along a first axis of said image one or more expansion bits, to convert each said string of n bits to a string of m bits, where m is greater than n and said first axis is the horizontal axis of said image and said expansion bits are disposed to form columns of said image;
   (c) first means for assigning a value to each expansion bit generated by said first inserting means comprising:
      (i) means for setting each expansion bit to one binary value if the pair of adjacent image bits on the horizontal line through said each expansion bit are both of said one binary value or if one said horizontally adjacent bit is of said one binary value and both adjacent image bits on either diagonal line through said each expansion bit are also of said one binary value; and
      (ii) means for setting said each expansion bit to the other binary value in the absence of an appropriate pair of adjacent image bits of said one binary value;
   (d) second means for inserting one or more rows of expansion bits for each i rows of bits along a second axis of the image to convert said i rows of bits to j rows of bits along the second axis, where j is greater than i and said second axis is the vertical axis of said image;
   (e) second means for assigning a value to each expansion bit generated by said second insertion means comprising:
      (i) means for setting each expansion bit to one binary value if the pair of adjacent image bits on the vertical line through said each expansion bit are both of said one binary value or if one said vertically adjacent bit is of said one binary value and both adjacent image bits on either diagonal line through said each expansion bit are also of said one binary value; and
      (ii) means for setting said each expansion bit to the other binary value in the absence of an appropriate pair of adjaent image bits of said one binary value; and (f) means for storing the enlarged image generated by the above steps.

11. A system as in claim 10 wherein said first inserting means inserts 1 expansion bit for each string of 5 bits.

12. A system as in claim 10 wherein said second inserting means inserts 1 row of expansion bits for each 5 rows of bits.

13. A system as in claim 10 further comprising means for copying the bits representing the firt two rows of said image in temporary storage before inserting said expansion bits.

14. A system as in claim 10 wherein said first and second inserting means comprise a lookup table.

* * * * *